US012654478B2

(12) United States Patent
Hildreth et al.

(10) Patent No.: US 12,654,478 B2
(45) Date of Patent: Jun. 16, 2026

(54) METHOD AND SYSTEM FOR CONTROLLING MORPHOLOGY AND PROPERTIES OF PRINTED REACTIVE INKS

(71) Applicant: Colorado School of Mines, Golden, CO (US)

(72) Inventors: Owen James Hildreth, Lakewood, CO (US); Steven John DiGregorio, Lakewood, CO (US)

( * ) Notice: Subject to any disclaimer, the term of this patent is extended or adjusted under 35 U.S.C. 154(b) by 0 days.

(21) Appl. No.: 18/786,083

(22) Filed: Jul. 26, 2024

(65) Prior Publication Data

US 2025/0033398 A1 Jan. 30, 2025

Related U.S. Application Data

(60) Provisional application No. 63/516,044, filed on Jul. 27, 2023.

(51) Int. Cl.
| | |
|---|---|
| *B05D 5/00* | (2006.01) |
| *B41J 11/00* | (2006.01) |
| *B41J 29/13* | (2006.01) |
| *B41M 5/00* | (2006.01) |
| *C09D 5/38* | (2006.01) |

(52) U.S. Cl.
CPC ........ *B41M 5/0011* (2013.01); *B41J 11/0015* (2013.01); *B41J 29/13* (2013.01); *B41M 5/0023* (2013.01); *C09D 5/38* (2013.01)

(58) Field of Classification Search
CPC ...................................................... B05D 5/00
See application file for complete search history.

(56) References Cited

U.S. PATENT DOCUMENTS

| | | | |
|---|---|---|---|
| 10,286,713 B2 | 5/2019 | Hildreth et al. | |
| 2020/0287137 A1* | 9/2020 | Bailie | ................. H01G 9/2059 |

OTHER PUBLICATIONS

Improving-the-density-and-electrical-properties-of-self-reducing-reactive-silver-inks-by Suppressing Complexing Agent Evaporation, Steven J. DiGregorio, Mary Pat Nicodemus, and Owen J. Hildreth, ACS Appl. Electron. Mater, 6, 7950-7959. (Year: 2024).*
MicroFab_JetLabII_Ink-jet_Printer, (Year: 2019).*
Morphological-regulation-of-printed-low-temperature-conductive-ink, Xiaoqin Wei, Rihui Yao,* and Junbiao Peng, Langmuir, 38, 9955-9966 (Year: 2022).*
Digregorio et al., "Chapter 6: Particle-less reactive inks," in Smart Multifunctional Nano-Inks (ed. Gupta et al.), Elsevier, Amsterdam, Netherlands, 2023, pp. 125-158.

(Continued)

*Primary Examiner* — Gordon Baldwin
*Assistant Examiner* — Mohammad Mayy
(74) *Attorney, Agent, or Firm* — Sheridan Ross P.C.

(57) ABSTRACT

Methods and devices for controlling a morphology of a printed reactive ink are provided. A substrate may be heated and a volume including at least a portion of the substrate may be saturated with at least one of an active ingredient or an inactive ingredient to a humidity level. Such heating and saturation of the volume forms a controlled printing environment. The reactive ink may then be printed onto the portion of the substrate within the controlled printing environment, wherein the morphology of the printed reactive ink is controlled based on the humidity level of the saturated volume and a temperature of the heated portion of the substrate.

13 Claims, 12 Drawing Sheets

(56) References Cited

OTHER PUBLICATIONS

Jeffries et al., "Low-Temperature Drop-on-Demand Reactive Silver Inks for Solar Cell Front-Grid Metallization," IEEE Journal of Photovoltaics, vol. 7, 2017, pp. 37-43.

Lefky et al., "Impact of solvent selection and temperature on porosity and resistance of printed self-reducing silver inks," Physica Status Solidi A, vol. 213, No. 10, Oct. 2016, pp. 2751-2758.

Lefky et al., "Ultra near-field electrohydrodynamic cone-jet breakup of self-reducing silver inks," Journal of Electronics, vol. 96, Dec. 2018, pp. 85-89.

Mamidanna et al., "Adhesion of reactive silver inks on indium tin oxide," Journal of Materials Science, vol. 54, Oct. 16, 2018, pp. 3125-3134.

Mamidanna et al., "Drop-on-demand printed microfluidics device with sensing electrodes using silver and PDMS reactive inks," Microfluidics and Nanofluidics, vol. 21, No. 172, Oct. 31, 2017, 9 pages.

Walker et al., "Reactive Silver Inks for High-Performance Printed Electronics," Material Matters, vol. 9, No. 1, 2014, pp. 2-5.

Walker et al., "Reactive Silver Inks for Patterning High-Conductivity Features at Mild Temperatures," Journal of the American Chemical Society, vol. 134, No. 3, Jan. 5, 2012, pp. 1419-1421.

* cited by examiner

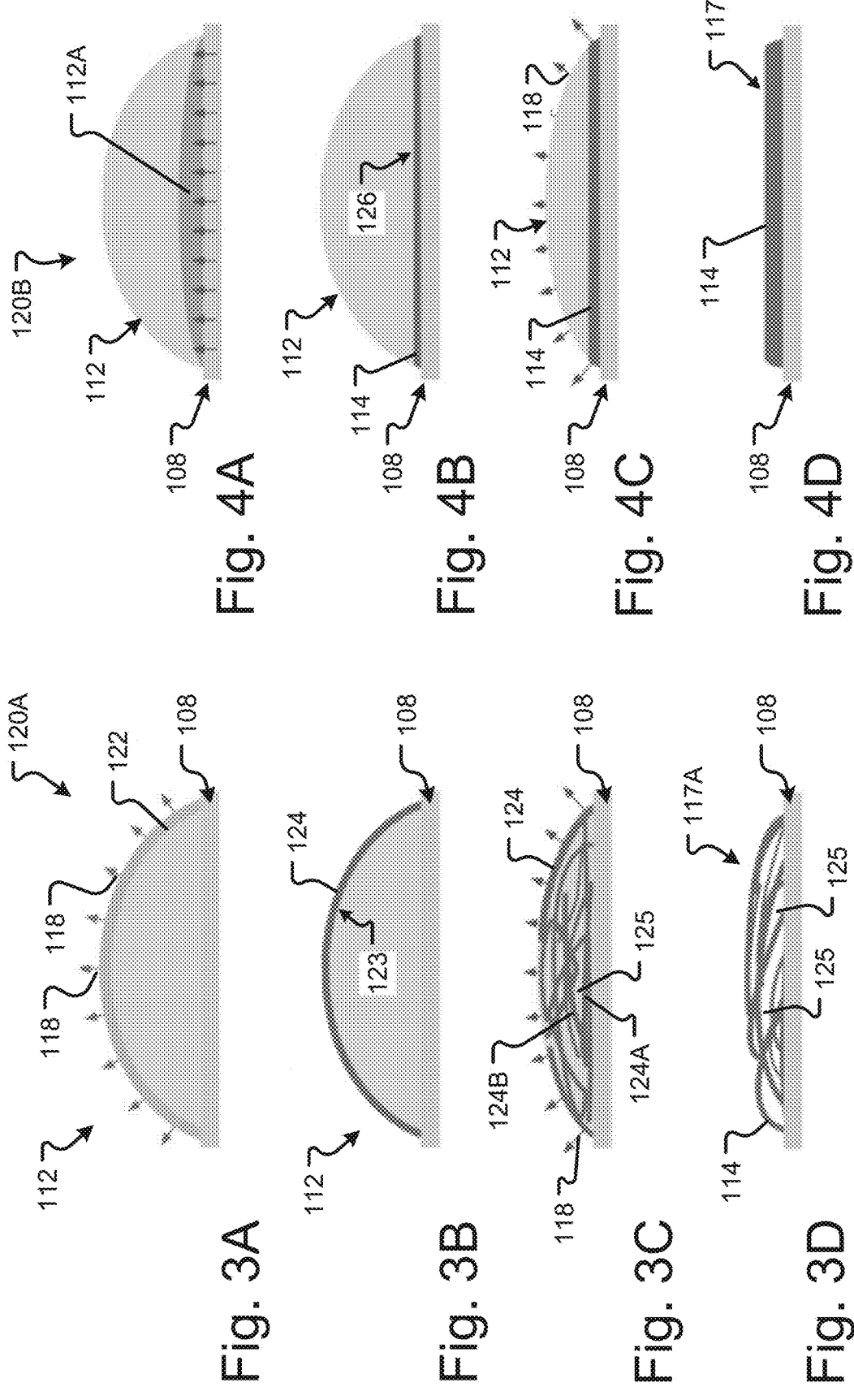

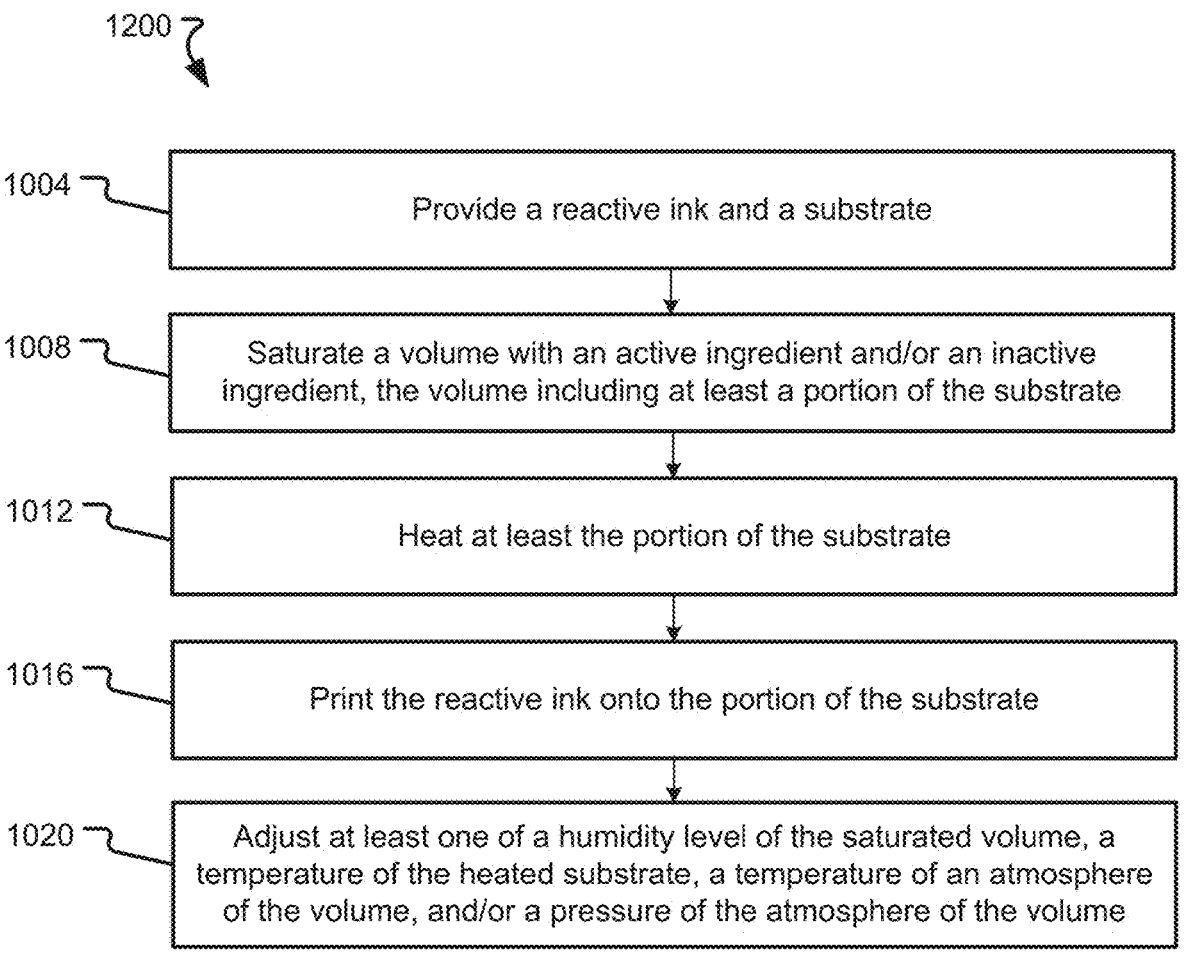

1200

1004 — Provide a reactive ink and a substrate

1008 — Saturate a volume with an active ingredient and/or an inactive ingredient, the volume including at least a portion of the substrate 1012 — Heat at least the portion of the substrate 1016 — Print the reactive ink onto the portion of the substrate 1020 — Adjust at least one of a humidity level of the saturated volume, a temperature of the heated substrate, a temperature of an atmosphere of the volume, and/or a pressure of the atmosphere of the volume

FIG. 10

METHOD AND SYSTEM FOR CONTROLLING MORPHOLOGY AND PROPERTIES OF PRINTED REACTIVE INKS

CROSS REFERENCE TO RELATED APPLICATIONS

This application claims priority to U.S. Provisional Application No. 63/516,044, filed on Jul. 27, 2023, and entitled "Method and System for Controlling Morphology and Properties of Printed Reactive Inks", the entirety of which is hereby incorporated by reference.

GOVERNMENT RIGHTS

This invention was made with government support under grant number DE-EE0008166 awarded by the United States Department of Energy. The government has certain rights in the invention.

FIELD

This disclosure relates generally to methods and systems for controlling a morphology and properties of printed reactive inks by controlling the printing environment.

BACKGROUND

Traditional particle-based inks effectively print clusters of particles onto a substrate and require a high temperature sintering process to produce a dense film. Reactive inks, in contrast, consist of chemical precursors and effectively print chemical reactions onto substrates. A reactive ink is generally shelf stable and produces a dense, high-quality film when printed at reasonably low temperatures (e.g., less than 150° C.). Reactive inks exist for numerous material systems, including metals and metal alloys (e.g., alloys of any two or more of Ag, Fe, Ni, Co, W, etc.), oxides ($SiO_2$, $TiO_2$, etc.), polymers (silicone, epoxies, etc.), and semiconductor materials (perovskites, etc.).

A given reactive ink contains chemical precursors for a target material, complexing agents to improve stability, and reaction agents (such as reducing or oxidizing agents) that cause the reaction to proceed forward and precipitate the target material once the reactive ink is printed. The target material, once dried, may form a film. For example, a common silver reactive ink used to produce a silver film consists of silver acetate (as the silver source), ammonia hydroxide to supply ammonium (as the stabilizing complexing agent), and formic acid (as the reducing agent). When the silver reactive ink is printed, the reaction proceeds when either the stabilizing complexing agent evaporates (known as complexing agent loss reduction) or when the ink is heated (known as thermally driven reduction). Depending on printing conditions (ink composition, contact angle, substrate material, substrate temperature, atmosphere temperature, atmosphere pressure, atmosphere humidity or saturation, and more), porosity of the printed silver film can range greatly.

Different regions within a reactive ink have different heat transfer and mass transport phenomena that ultimately impact reaction/precipitate rate distribution during printing. For example, in a silver reactive ink, evaporation of the complexing agent at the liquid/vapor interface induces precipitation and growth of the silver film at this interface. In addition, heat transfer from the substrate at the liquid/solid interface can also induce precipitation and growth of the silver film. Interior heating and complexing agent loss also leads to particle nucleation of the target material (such as silver) and growth on the interior of the droplet. Thus, a target material film morphology depends on these regions or their mixture.

Conventionally, most reactive inks have a narrow processing window where a high quality film (or films of a specific morphology) may be produced. For example, the morphology and associated material properties (conductivity, density, dielectric constants, dielectric strength, corrosion resistance, electromigration resistance, etc.) of some reactive inks can differ dramatically when the printing temperature varies by as little as about 2° C. or less. As a result, tight temperature controls must be in place to produce the desired film. These constraints might become tighter if multiple layers need to be printed in order to achieve the target film thickness.

SUMMARY

This disclosure provides a method to control the porosity and quality of metal films produced by printed reactive inks by controlling a printing environment of the reactive ink. The printing environment may be used to, for example, control an evaporation rate of the reactive ink's complexing agents, reactants, and/or products. The printing environment may also be adjusted to control loss of a complexing agent associated with the reactive ink. In this manner, the composition of a droplet of the reactive ink is controlled over time.

Controlling morphology is a key challenge with reactive inks. Unlike particle inks, where the shape of the resulting particle cluster is determined solely by the fluid flow within the evaporating droplet, reactive inks are constantly nucleating and growing particles. As a result, controlling a reaction rate distribution within the evolving droplet is a component of controlling the morphology of a printed reactive ink.

The present disclosure provides a new way to control the reaction rate distribution within a printed reactive ink and, as a result, controls the morphology of the resulting film of a target material produced by the reactive ink. Specifically, the reaction rate distribution is controlled by controlling the evaporation rate of the complexing agents and reactants used to stabilize the reactive ink. For example, to produce a dense film, the reactive ink may be printed onto a heated substrate in an atmosphere saturated with the reactive ink's stabilizing complexing agent. While printing onto a heated substrate is itself known, printing in an "evaporating shielding" environment is new and novel and dramatically expands the types of reactive inks that can be used and the resulting performance of the reactive inks.

Additional specific advantages of embodiments of the present disclosure include reducing the amount of silver used to produce a photovoltaic cell by about 90% and/or reducing materials costs in a PV cell by about 15%. These and other advantages will be apparent from the disclosure contained herein.

In an aspect of the present disclosure, a method of controlling a morphology of a target material formed by printing a reactive ink comprises providing the reactive ink and a substrate; saturating a volume proximate to a portion of the substrate with a predetermined substance; and printing the reactive ink onto the portion of the substrate, wherein the morphology of the printed reactive ink is controlled based on a concentration of the predetermined substance in the volume and a temperature of the portion of the substrate.

In embodiments, the volume may be enclosed in an enclosure to form an enclosed printing environment.

In embodiments, the predetermined substance may be provided in the volume in a vaporized form.

In embodiments, the predetermined substance may comprise at least one of an active ingredient, an inactive ingredient, and a saturating complexing agent. The reactive ink may, but need not, include a complexing agent different than the saturating complexing agent of the predetermined substance used to saturate the volume. The reactive ink may, but need not, include a complexing agent that is the same as the saturating complexing agent of the predetermined substance used to saturate the volume.

In embodiments, the saturating complexing agent may comprise at least one of ammonia, one or more amines having 1-15 carbon atoms, hydrochloric acid, nitric acid, formic acid, and acetic acid.

In embodiments, the predetermined substance may comprise at least one of a catalyst, a reactant, and a product.

In embodiments, the reactive ink may comprise chemical precursors to produce a layer of a target material on the substrate, and the target material may comprise at least one of silver, platinum, gold, nickel, glass, and copper.

In embodiments, a temperature of an atmosphere of the volume may be an ambient temperature.

In embodiments, the method may further comprise adjusting at least one of the concentration of the predetermined substance in the volume, the temperature of the portion of the substrate, a temperature of an atmosphere in the volume, and a pressure of the atmosphere to control the morphology of the printed reactive ink.

In embodiments, the volume may include an entirety of the substrate.

In embodiments, the volume may be saturated locally by an injector configured to deliver the predetermined substance to the volume. The reactive ink may, but need not, be printed in an open printing environment.

In another aspect of the present disclosure, a device comprises a print head; an ink dispenser associated with the print head, the ink dispenser configured to deliver reactive ink to a predetermined portion of a substrate; and a supply of a substance operable to form an area proximate to the predetermined portion of the substrate with an atmosphere adapted to control morphology and properties of a layer of a target material formed by the reactive ink on the substrate, wherein the ink dispenser is configured to deliver the reactive ink within the area.

In embodiments, the device may further comprise a heater configured to heat the substrate.

In embodiments, the print head may extend through a cover, and the cover may be configured to retain the substance within the area. The device may, but need not, further comprise an enclosure positioned around the substrate, and the cover may, but need not, be positioned on a top side of the enclosure to form an enclosed printing environment.

In another aspect of the present disclosure, a substrate has a printed material coating having an electrical resistance of 1 $\Omega$/mm or less and a porosity less than 10%.

In embodiments, the printed material coating may comprise a printed silver coating formed from printing a reactive silver ink in a controlled printing environment.

The following references relate to the present disclosure and are incorporated by reference herein: U.S. Pat. No. 10,286,713; Reactive Inks and Self-Reducing Inks, S. Brett Walker; Reactive Silver Inks for Patterning High-Conductivity Features at Mild Temperatures, S. Brett Walker and Jennifer A. Lewis, J. Am. Chem. Soc. 2012, 134, 3, 1419-

1421; "Particle-less Reactive Inks," DiGregorio, S; Hildreth, O, Smart Multifunctional Nano-Inks: Fundamentals and Emerging Applications, R. Gupta and T. Nguyen, Eds, Elsevier, 2022 (In Press); Ultra Near-Field Electrohydrodynamic Cone-Jet Breakup of Self-Reducing Silver Inks, C. S. Lefky, A. Mamidanna, and O. Hildreth, J. Electrostat; 2018, 96, 85-89; Adhesion of Reactive Silver Inks on Indium Tin Oxide, A. Mamidanna, A. Jeffries, M. Bertoni, O. Hildreth, J. of Materials Science 2018, 9, 1-10; "Drop-on-Demand Printed Microfluidics Device with Sensing Electrodes Using Silver and PDMS Reactive Inks," A. Mamidanna, C. S. Lefky, O. Hildreth, Microfluid Nanofluid 2017, 21, R15; Low-Temperature Drop-on-Demand Reactive Silver Inks for Solar Cell Front-Grid Metallization, A. M. Jeffries, A. Mamidanna, L. Ding, O. Hildreth, M. I. Bertoni, IEEE Journal of Photovoltaics 2017, 7, 37-43; Impact of Solvent Selection and Temperature on Porosity and Resistance of Printed Self-Reducing Silver Inks, C. S. Lefky, A. Mamidanna, Y. Huang, O. Hildreth, Phys. Status Solidi A 2016, 1-8; and Reactive Silver Inks for High-Performance Printed Electronics, S. Brett Walker, Bok Yeop Ahn, Jennifer A. Lewis.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

It is to be noted that the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "means" as used herein shall be given its broadest possible interpretation in accordance with 35 U.S.C. Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Unless otherwise noted, all components or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIGS. 3A-3D illustrate a first stage, a second stage, a third stage, and a fourth stage, respectively, of a complexing agent loss according to at least one embodiment of the present disclosure;

FIGS. 4A-4D illustrate a first stage, a second stage, a third stage, and a fourth stage, respectively, of a thermal reduction according to at least one embodiment of the present disclosure;

FIG. 10 is a flowchart according to at least one embodiment of the present disclosure.

Figures 1A, 1B:
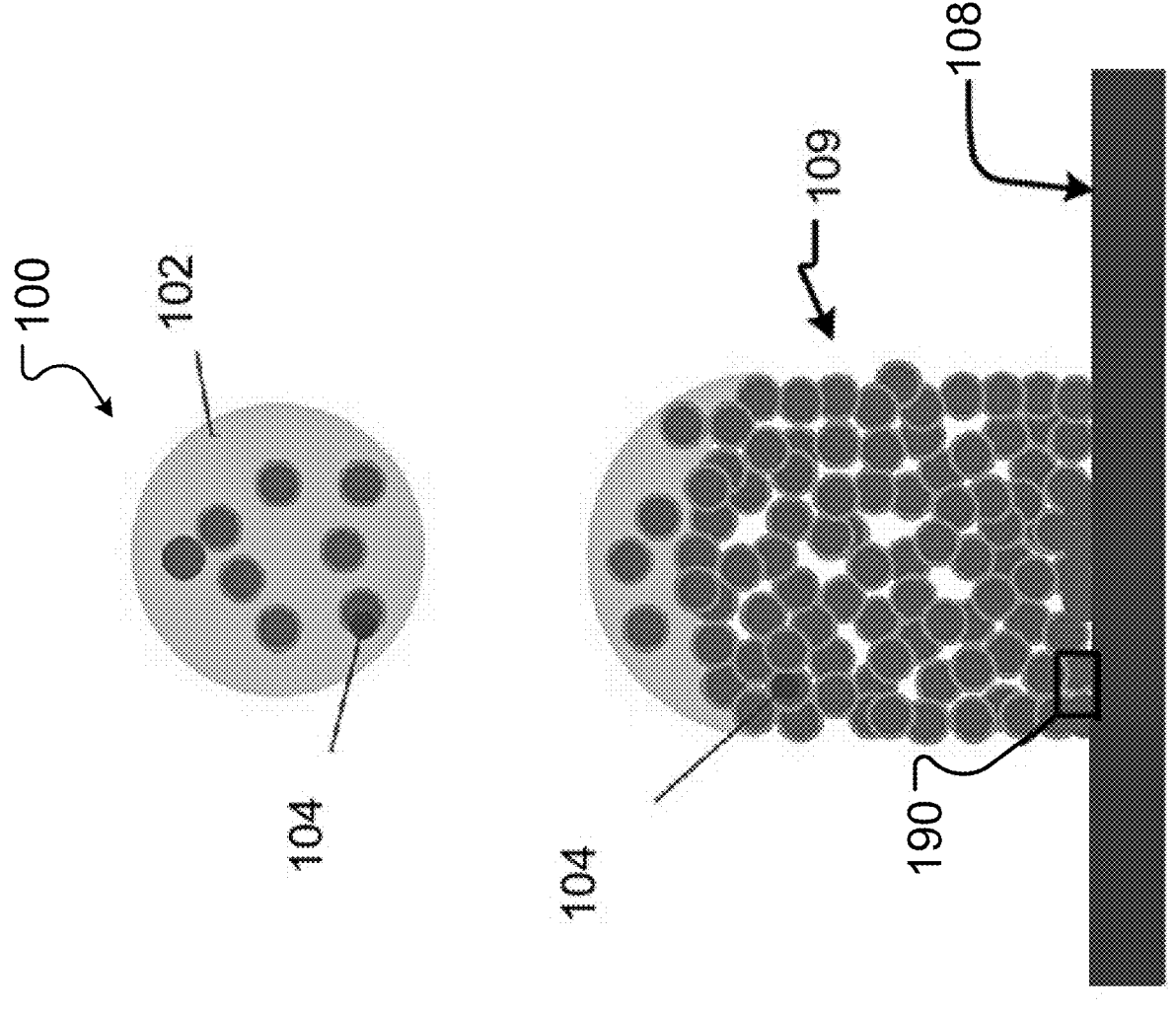
FIG. 1A is schematic image of a traditional particle-based ink.
FIG. 1B is a schematic image of the traditional particle-based ink printed on a substrate as a film.

The following is a listing of components according to various embodiments of the present disclosure, and as shown in the drawings:

NUMBER COMPONENT

100 Particle-based ink
102 Solvent
104 Particles
106 Voids between particles
108 Substrate
109 Film produced by particle based ink
112 Reactive ink
112A Heated reactive ink
114 Target material
116 Reaction agent
117 Film produced by reactive ink
118 Complexing agent
120A Printing process
120B Printing process with a thermal reduction
122 Area of low concentration of complex agent
123 Liquid-vapor interface
124 Skin of target material
125 Pocket
126 Solid-liquid interface
128A Printer with an enclosed printing environment
128B Printer with an open printing environment
129 Enclosure
130 Line resistance of a line of target material
132 Print temperature
134A Top-down SEM images
134B Cross-sectional SEM images
135 Enclosed printing environment
136 Open printing environment
138 Cross-sectional SEM images
140 Chart
142 Line resistance
144 Temperature
146 Print head
148 Lid or cover
150 Base
152 Ink dispenser (or needle)
154 Heater
156 Wall
158 Reservoir
159 Substance
160 Dispenser
161 Sensor
162 Print head 164 Ink dispenser (or needle)
166 Injector
168 Saturated volume
170 Base
172 Heater
1000 Method
1004 Operation of method
1008 Operation of method
1012 Operation of method
1016 Operation of method
1020 Operation of method Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

DETAILED DESCRIPTION

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1C:
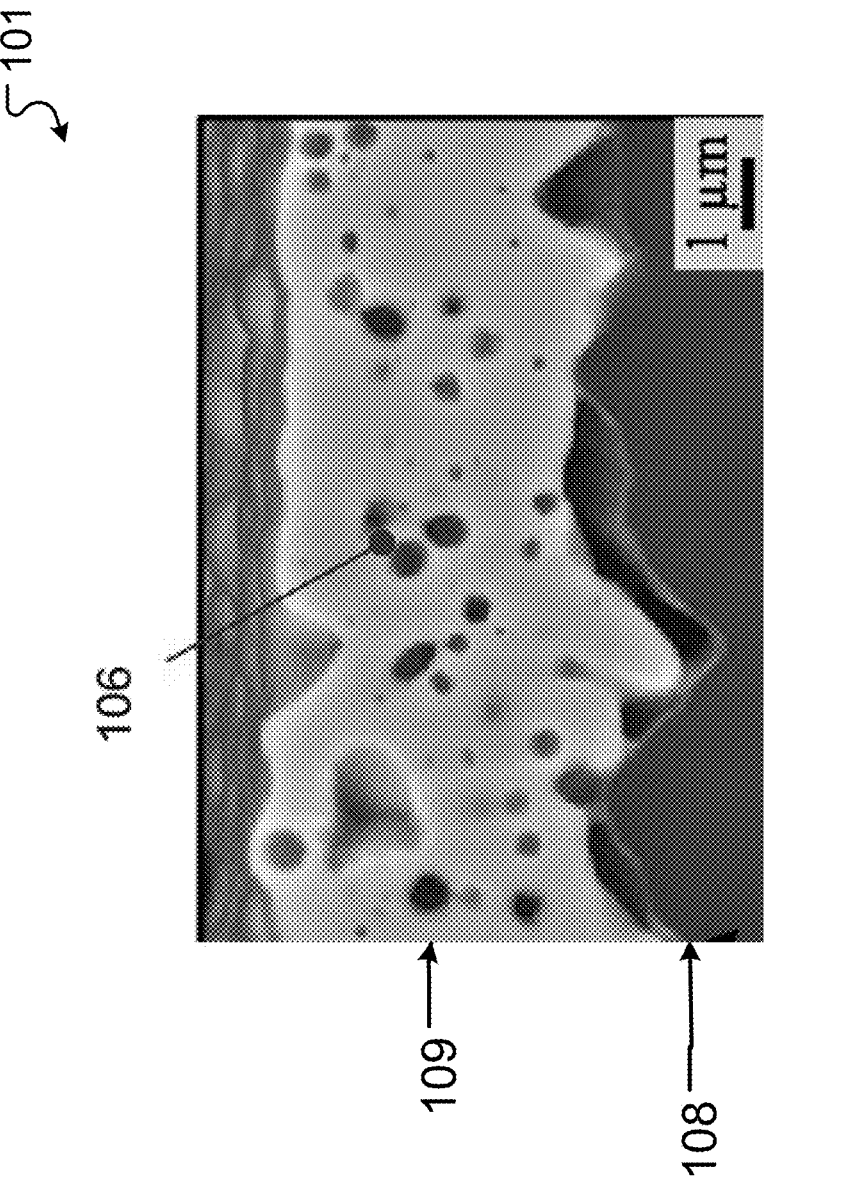
FIG. 1C is a cross-section from a Scanning Electron Microscope (SEM) image of the traditional particle-based ink.

FIG. 1A is a schematic image of a traditional particle-based ink 100. The traditional particle-based ink 100 comprises particles 104 and a solvent 102. As shown in FIG. 1B and as previously described, before printing onto a substrate 108, the traditional particle-based ink 100 comprises particles 104 in the solvent 102. After the particle-based ink 100 is printed, the solvent 102 evaporates and leaves the particles 104 as a film 109 on the substrate 108. The printing process with the particle-based ink 100 typically requires post processing operations to improve the quality and properties of the film 109 which increases the time and expense required to produce the film 109. For example, a film 109 produced by the particle-based ink 100 may require a high temperature sintering process to produce a dense film and to reduce the presence of voids between the particles 104 within the film 109 on the substrate 108. FIG. 1C is a cross-section from a Scanning Electron Microscope (SEM) image 101 of the film 109 of the traditional particle-based ink 100 at box 190 in FIG. 1B. As illustrated in FIG. 1C the SEM image 101 includes the film 109 produced by the particle-based ink 100 with reduced voids 106 between the particles 104 within the film 109 on the substrate 108.

Figures 2A, 2B:
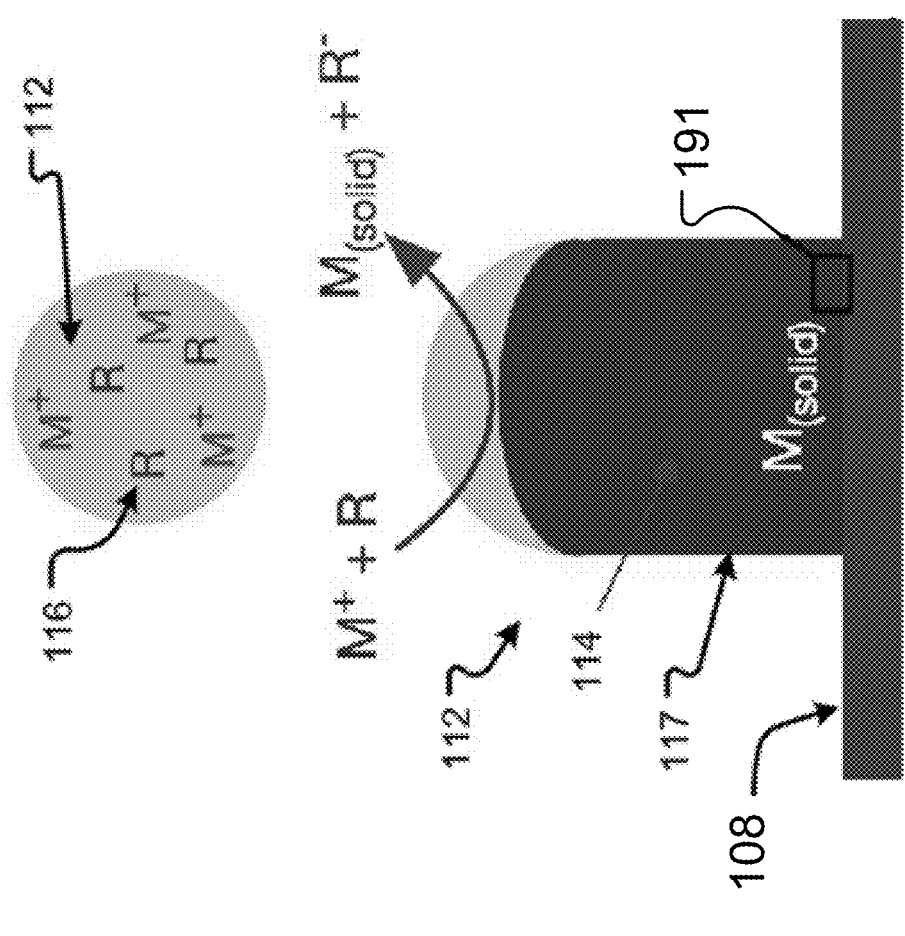
FIG. 2A is a schematic image of a reactive ink according to at least one embodiment of the present disclosure.
FIG. 2B is a schematic image of the reactive ink on a substrate as a film according to at least one embodiment of the present disclosure.

FIG. 2A is a schematic image of a reactive ink 112 according to at least one embodiment of the present disclosure. As shown in FIG. 2A, the reactive ink 112 includes reacting agents 116. FIG. 2B is a schematic image of the reactive ink 112 on a substrate 108 as a film 117 according to at least one embodiment of the present disclosure. The reactive ink 112 can be similarly printed onto the substrate 108. Reactive inks 112 are typically shelf-stable and produce a dense, high-quality film 117 when printed at low temperatures (e.g., <150° C.). Reactive inks 112 exist for numerous material systems such as, for example, metals and metal alloys (e.g., alloys of any two or more of Ag, Fe, Ni, Co, W, etc.), oxides (e.g., $SiO_2$, $TiO_2$, etc.), polymers (e.g., silicone, epoxies, etc.), and/or semiconductors (perovskites, etc.).

Figure 2C:
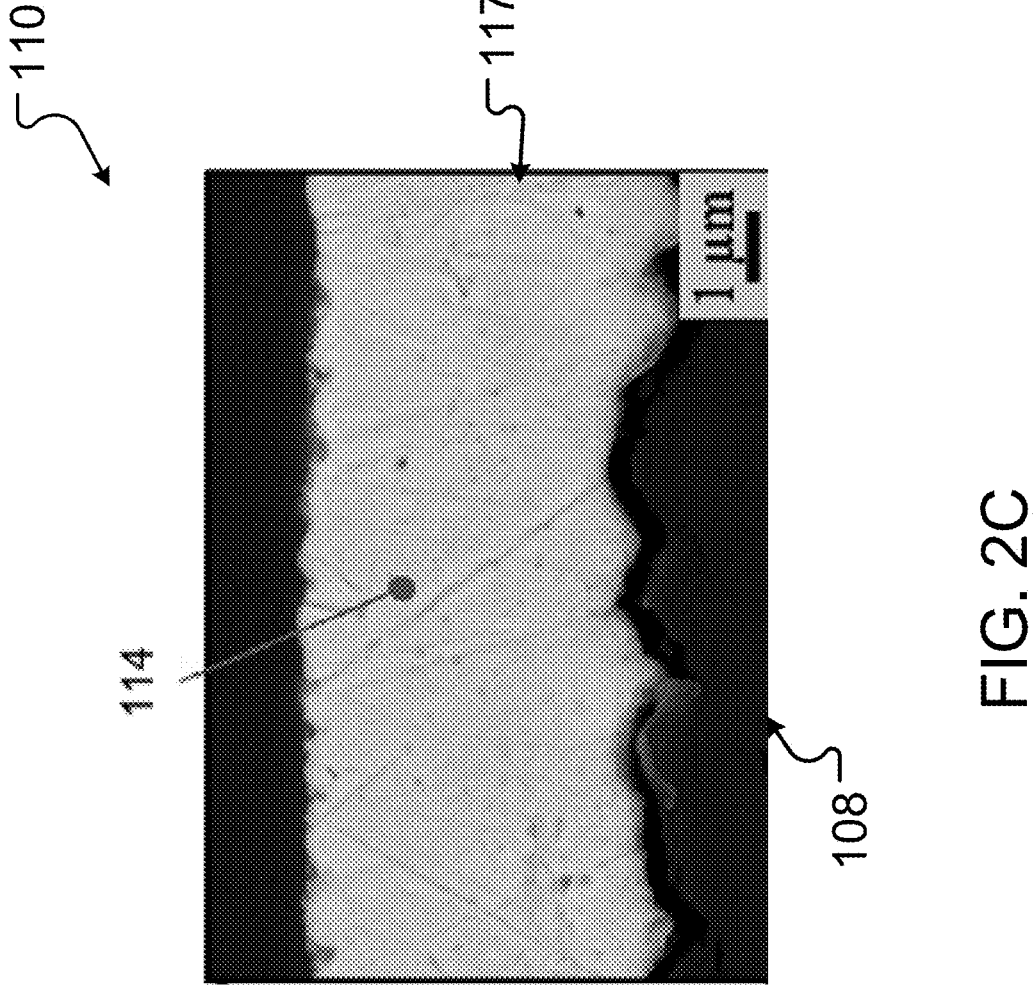
FIG. 2C is a cross-section from a SEM image of the reactive ink according to at least one embodiment of the present disclosure.

As illustrated in FIG. 2B, the reactive ink 112 includes one or more chemical precursors for a target material 114 to be printed onto the substrate 108 as the film 117, one or more complexing agents to improve stability of the reactive ink 112, and one or more reaction agents 116 that cause a reaction in the reactive ink 112 to proceed and precipitate the target material 114 once the reactive ink 112 is printed (or "deposited" on the substrate 108). When the reactive ink 112 dries, the target material 114 is left as a dry film 117. For example, a reactive ink 112 may be a silver reactive ink having silver acetate (as the source of silver as the target material 114), ammonia hydroxide to supply ammonium (as the complexing agent), and formic acid (as the reacting agent 116). FIG. 2C is a cross-section from a SEM image 110 of the film 117 of the reactive ink 112 at box 191 in FIG. 2B. As illustrated in FIG. 2C the SEM image 110 includes the target material 114 left as the dry film 117 on the substrate 108. When printed, the reaction occurs when either the complexing agent evaporates (e.g., complexing agent loss reduction) and/or the reactive ink 112 is heated (e.g., a thermally driven reduction) as will be described in detail in FIGS. 3A-3D and 4A-4D. Porosity of the film 117 formed by embodiments of the present disclosure can range from <0.1% to >99% depending on the printing conditions such as, for example, ink composition, contact angle, substrate material, substrate temperature, atmosphere temperature, atmosphere pressure, atmosphere humidity or saturation, etc.

Turning to FIG. 3A, loss of a complexing agent 118 from a reactive ink 112 is shown at a first stage of a printing process 120A. As shown in FIG. 3A, as the complexing agent 118 begins to evaporate, an area 122 of a low concentration of the complexing agent 118 is formed at a surface of the reactive ink 112.

In FIG. 3B, a second stage of the printing process 120A is illustrated in which a reduction interface is formed. As the complexing agent 118 continues to evaporate, a skin 124 of the target material 114 is formed at the liquid-vapor interface 123. The reduction interface (i.e., the skin 124) may comprise silver when the target material 114 is silver. However, other target materials 114 are contemplated.

FIG. 3C illustrates a third stage of the printing process 120A in which the complexing agent 118 is mostly evaporated. As evaporation of the complexing agent 118 proceeds, the skins 124 of the target material 114 repeatedly form, fracture, and reform. The skins 124 may be thin but are mechanically self-supporting. Pockets 125 of complexing agent 118 can be trapped between fractured layers 124A, 124B of the skin 124 as the outer skin 124 repeatedly fractures and reforms.

A fourth stage of the printing process 120A is illustrated in FIG. 3D in which the target material 114 is left on the substrate 108. As generally illustrated in FIG. 3D, as the ink continues to dry and the complexing agent 118 fully evaporates, a dried target material 114 is left as a film 117A on the substrate 108. However, the film 117A may include voids formed by the pockets 125.

Turning to FIGS. 4A-4D, a printing process 120B according to the present disclosure, comprising a thermal reduction of a reactive ink 112, is shown. FIG. 4A illustrates a first stage of the printing process 120B in which the substrate 108 is heated. As a result, a portion 112A of the reactive ink 112 proximate to the substrate 108 is heated.

FIG. 4B illustrates a second stage of the printing process 120B in which a reduction interface is formed. With thermal reduction, the target material 114 may be formed at any location within the reactive ink according to the Arrhenius equation. In at least one embodiment, as the substrate 108 is heated, the target material 114 is formed at the solid-liquid interface 126. Reduction at the solid-liquid interface 126 beneficially forms the target material 114 on the substrate 108 in a bottom-up manner that allows new layers of the target material 114 to form without trapping the reactive ink 112 within pockets. In some embodiments, the target material 114 is silver, although other target materials are contemplated.

As generally illustrated in FIG. 4C, in a third stage of the printing process 120B, the liquid volume of the reactive ink 112 decreases. For example, the complexing agent 118 may continue to evaporate, and the target material 114 continues to be deposited onto the substrate 108.

As shown in FIG. 4D, when the complexing agent is substantially completely evaporated, the target material 114 is left at the substrate 108 as a film 117B which is substantially solid with few or no voids. The bottom-up manner of deposition of the target material 114 beneficially results in a dense morphology. For example, in at least some embodiments, the film 117B produced by the printing process 120B of FIG. 4 has a density that is greater than a density of the film 117A produced by the printing process 120A described in conjunction with FIGS. 3A-3D.

Figure 5:
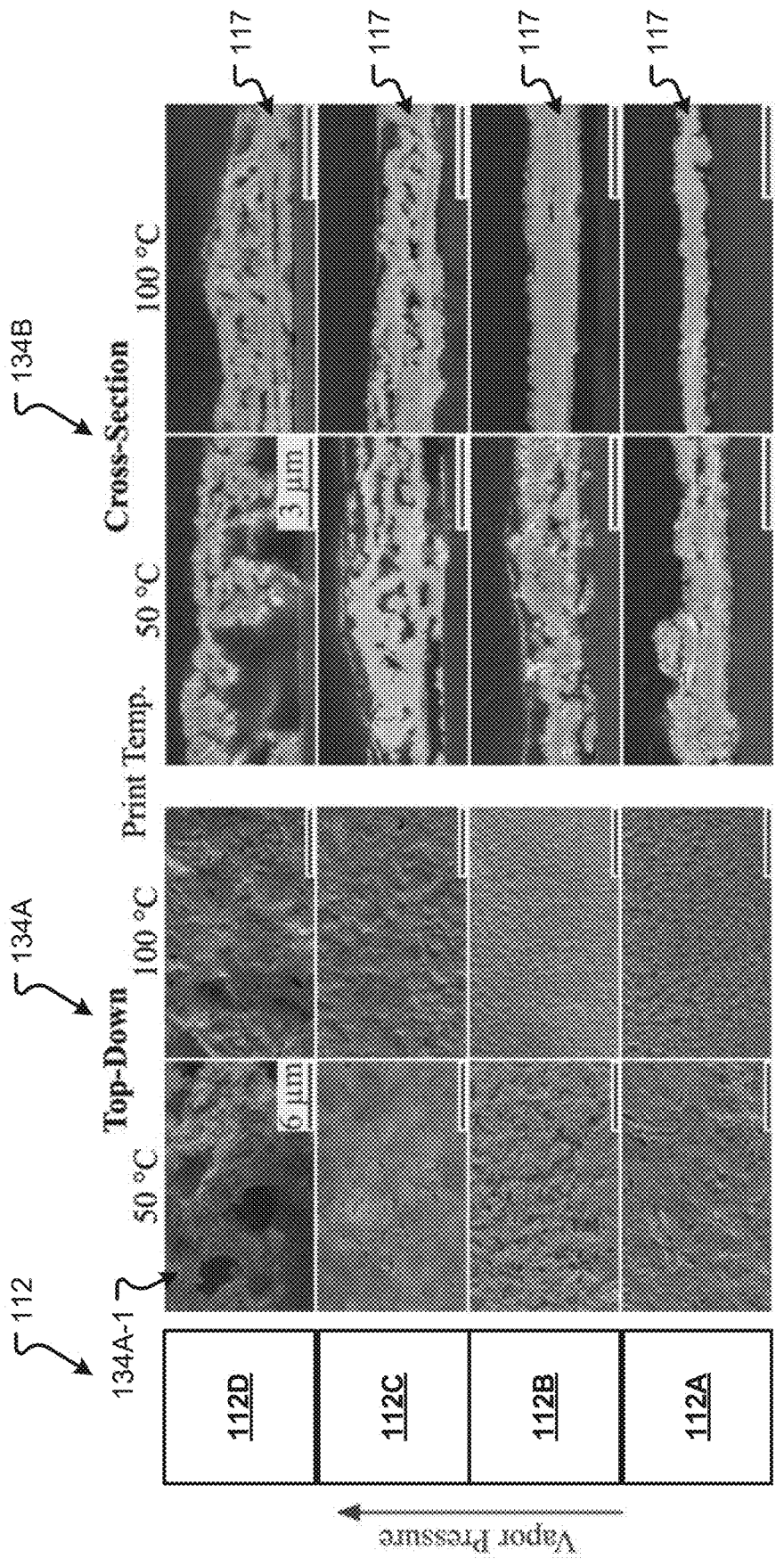
FIG. 5 shows top down and cross-sectional SEM images of silver lines printed from reactive inks containing complexing agents with increasing vapor pressure and at different temperatures according to at least one embodiment of the present disclosure.

Turning to FIG. 5, top-down SEM images 134A and cross-sectional SEM images 134B of films 117 produced by reactive inks 112 with different complexing agents 118A, 118B, 118C and 118D illustrate an effect of various vapor pressures on the morphology of the target material 114 resulting from printing the reactive ink 112. Specifically, the bottom row provides images of lines of a target material 114 produced by a reactive ink 112A comprising propylamine as a complexing agent 118. The second row from the bottom provides images of lines of a target material 114 produced by a reactive ink 112B comprising ethylamine as a complexing agent 118. The third row from the bottom provides images of lines of a target material 114 produced by a reactive ink 112C comprising methylamine as a complexing agent 118. The fourth row from the bottom provides images of lines of a target material 114 produced by a reactive ink 112D comprising ammonia as a complexing agent 118. In the images of FIG. 5, the target material 114 is silver.

The images of FIG. 5 generally illustrate a correlation between complexing agents 118 with lower vapor pressures and increased density of the target material 114 in a film 117. As will be appreciated by one of skill in the art, the increased density of the target material 114 in the film 117 beneficially contributes to lower resistivities. For example, the top-down image 134A-1 illustrating a film 117 formed by a reactive ink 112D with the ammonia complexing agent 118 printed at 50° C. reveals the presence of large voids, indicating a less dense structure compared to the other reactive inks printed at the same temperature.

Figure 6:
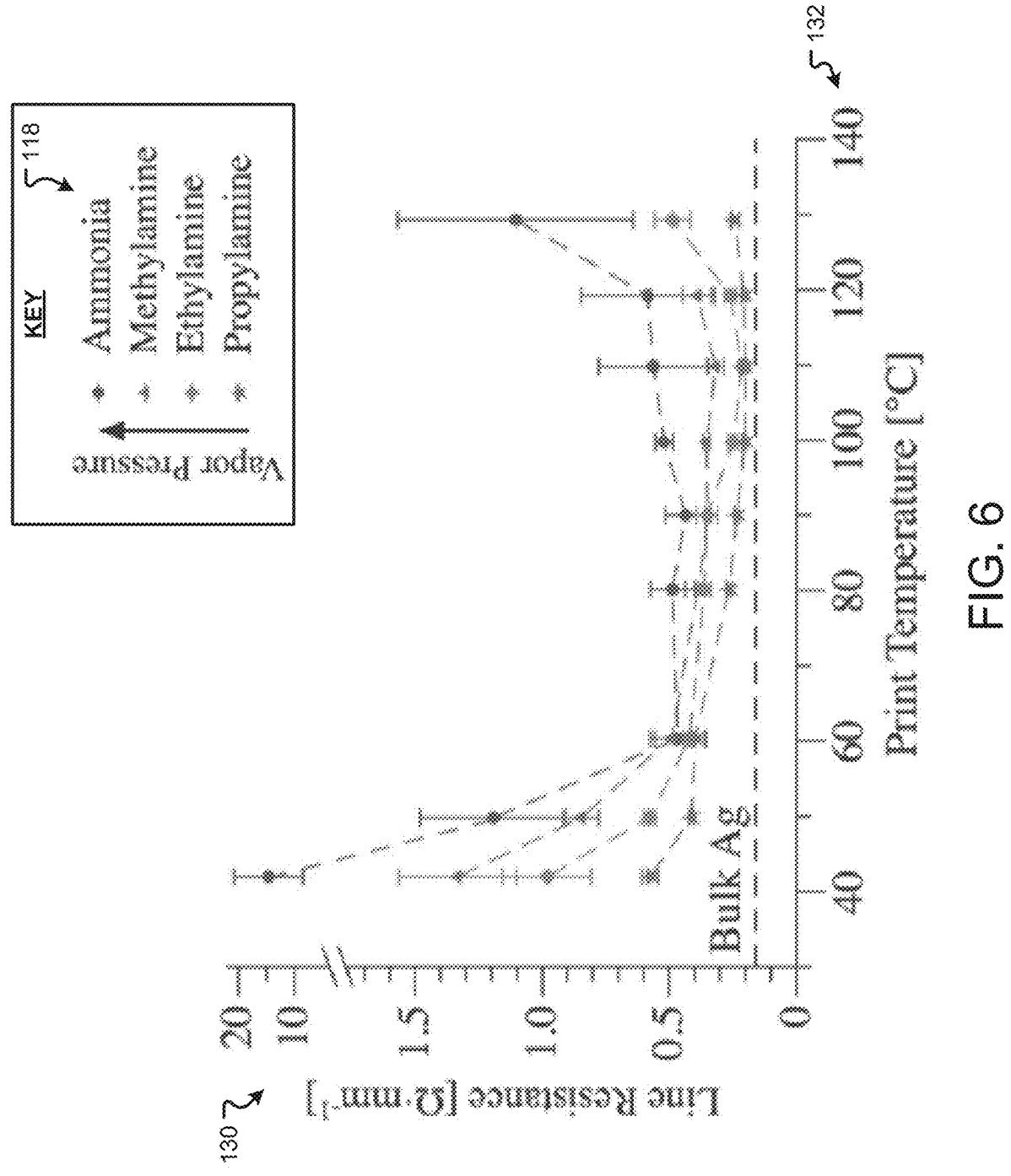
FIG. 6 is a graph of the line resistance of the silver lines of FIG. 5 according to at least one embodiment of the present disclosure.

Turning to FIG. 6, a graph showing line resistance 130 (on the Y-axis) of lines of the target material 114 produced with reactive inks 112A, 112B, 112C and 112D comprising the complexing agents 118 (propylamine, ethylamine, methylamine, and ammonia) shown in FIG. 5 is illustrated. The lines of the target material 114 were produced by printing the reactive inks at various temperatures 132 between 40° C. and 130° C. (indicated on the X-axis). As previously mentioned, a porosity of the printed target material 114 may be affected by the vapor pressure of the complexing agent 118. This is illustrated in FIGS. 5 and 6, where the results of reactive inks 112 with complexing agents 118 having increasing vapor pressure—propylamine, ethylamine, methylamine, and ammonia—are shown. As illustrated in FIGS. 5 and 6, complexing agents 118 with lower vapor pressure (e.g., propylamine) result in denser lines of the printed target material 114 with improved electrical properties. Thus, a morphology of the target material 114 can be controlled by at least selecting a complexing agent 118 based on the vapor pressure.

The morphology of the target material 114 of the printed reactive ink 112 can also be controlled at least by controlling an environment (or the environmental conditions) in which the reactive ink 112 is printed. For example, in some embodiments of the present disclosure, a humidity level or saturation of the atmosphere in which the reactive ink 112 is printed may be controlled. Further, the atmosphere may be saturated with a vapor or material that actively or passively controls where the reaction occurs and/or the rate of the reaction. For example, the atmosphere may be saturated with a predetermined substance, such as one or more of a complexing agent 118, a catalyst, a reactant, and/or a product.

Figure 7A:
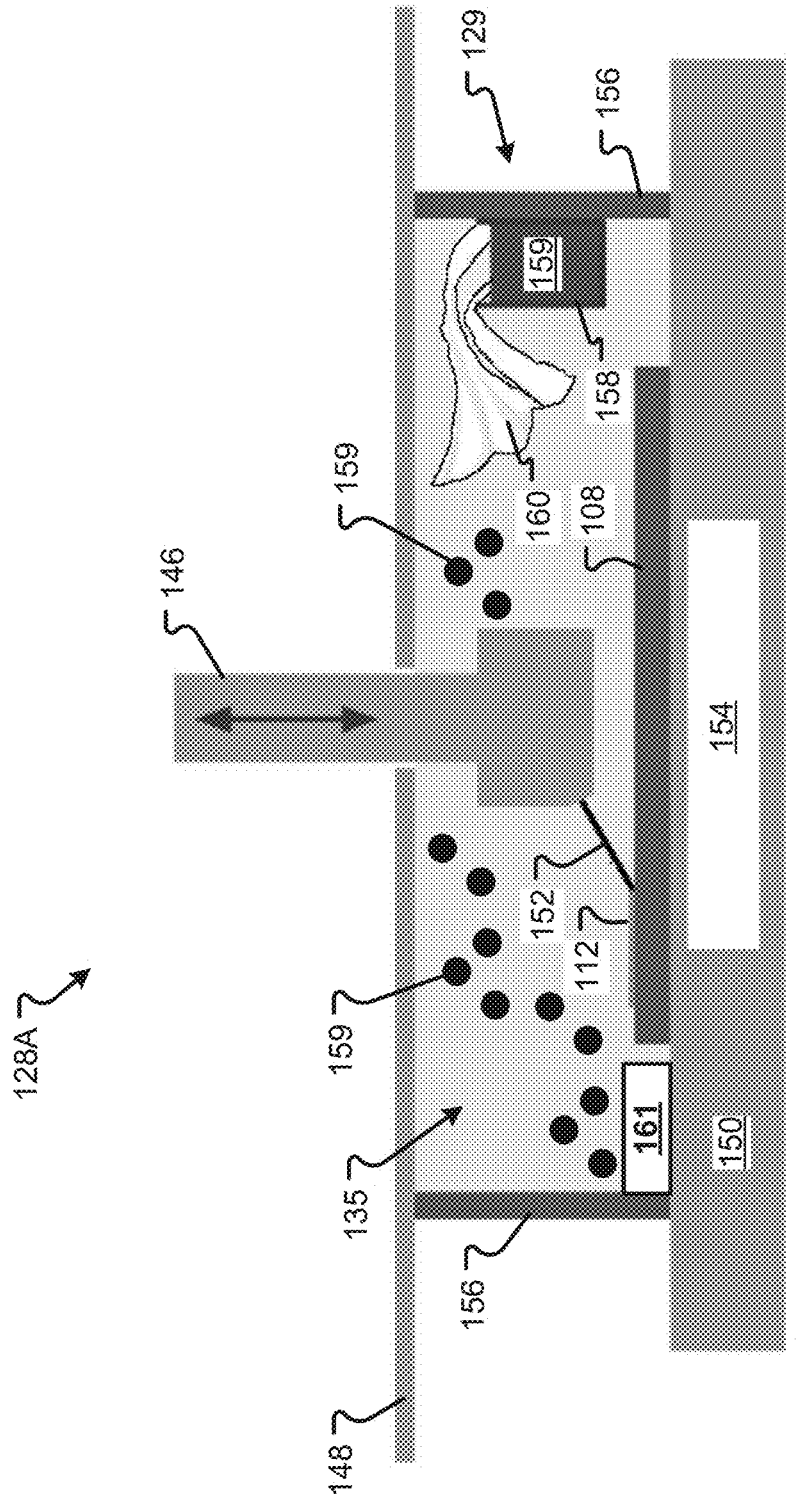
FIG. 7A is a schematic illustration of an enclosed printing environment according to at least one embodiment of the present disclosure.
Figure 7B:
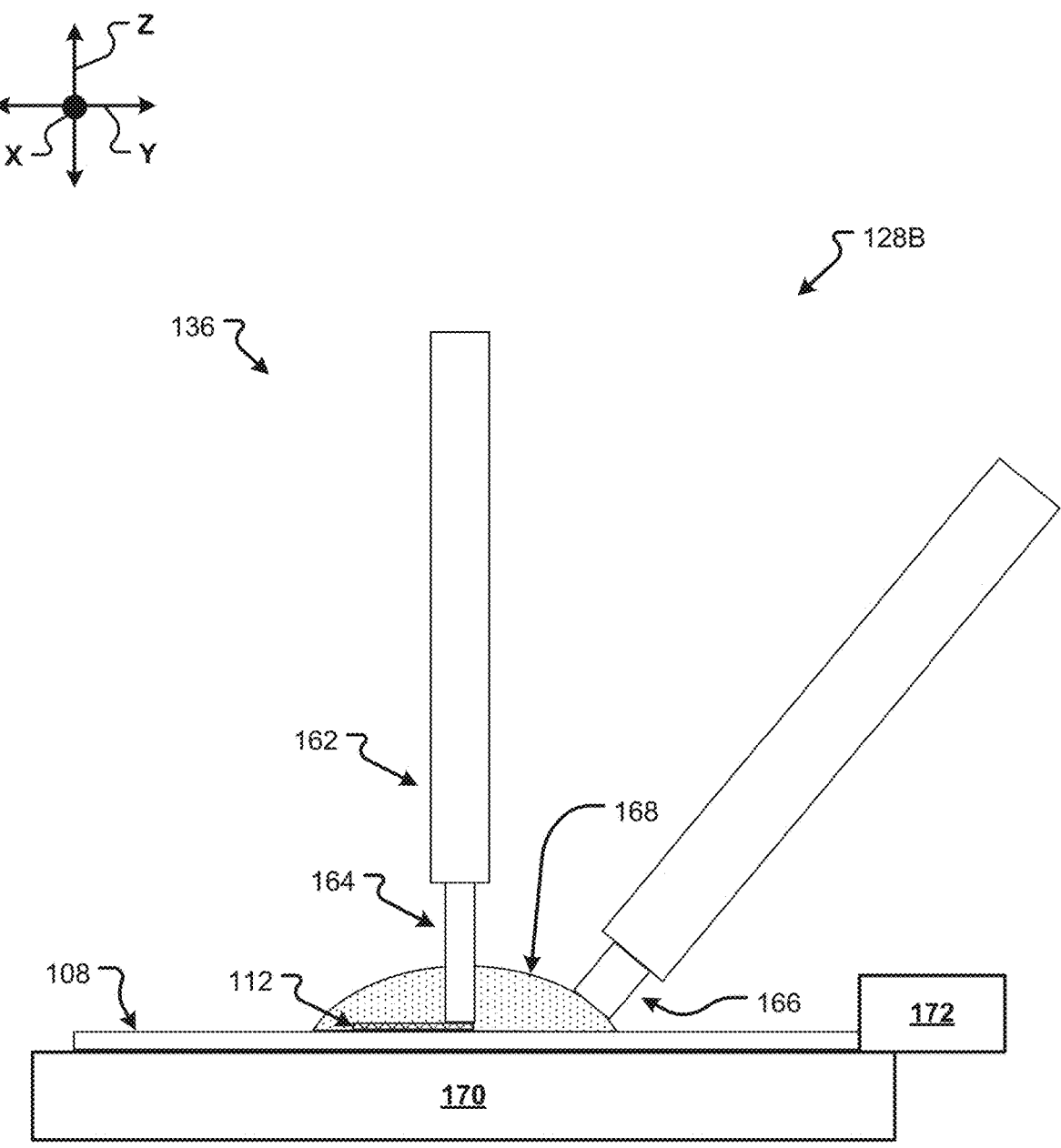
FIG. 7B is a schematic illustration of an open printing environment according to at least one embodiment of the present disclosure.
Figure 8:
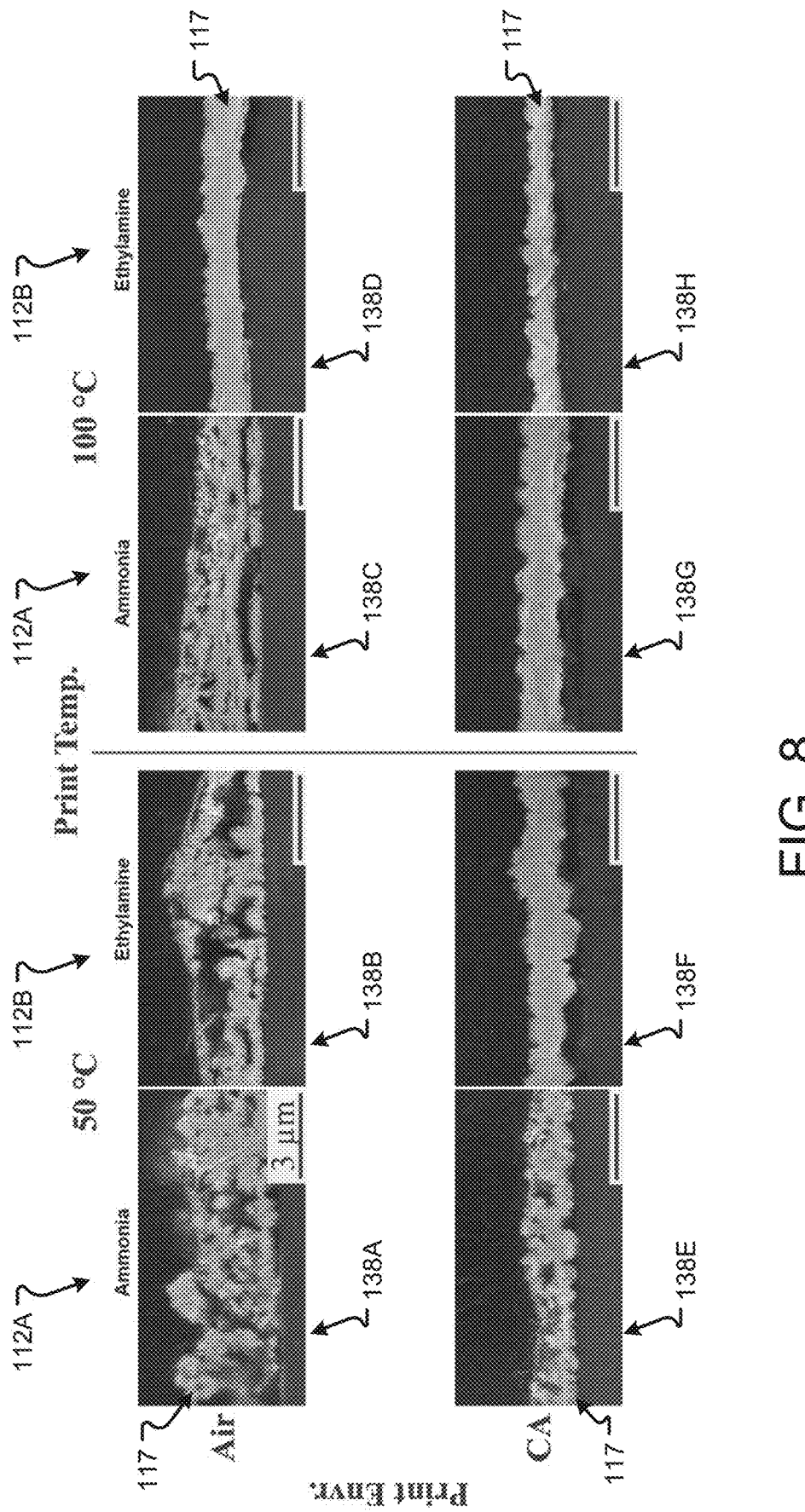
FIG. 8 shows cross-sectional SEM images of silver lines printed with reactive inks in different printing environments and at different temperatures according to at least one embodiment of the present disclosure.
Figure 9:
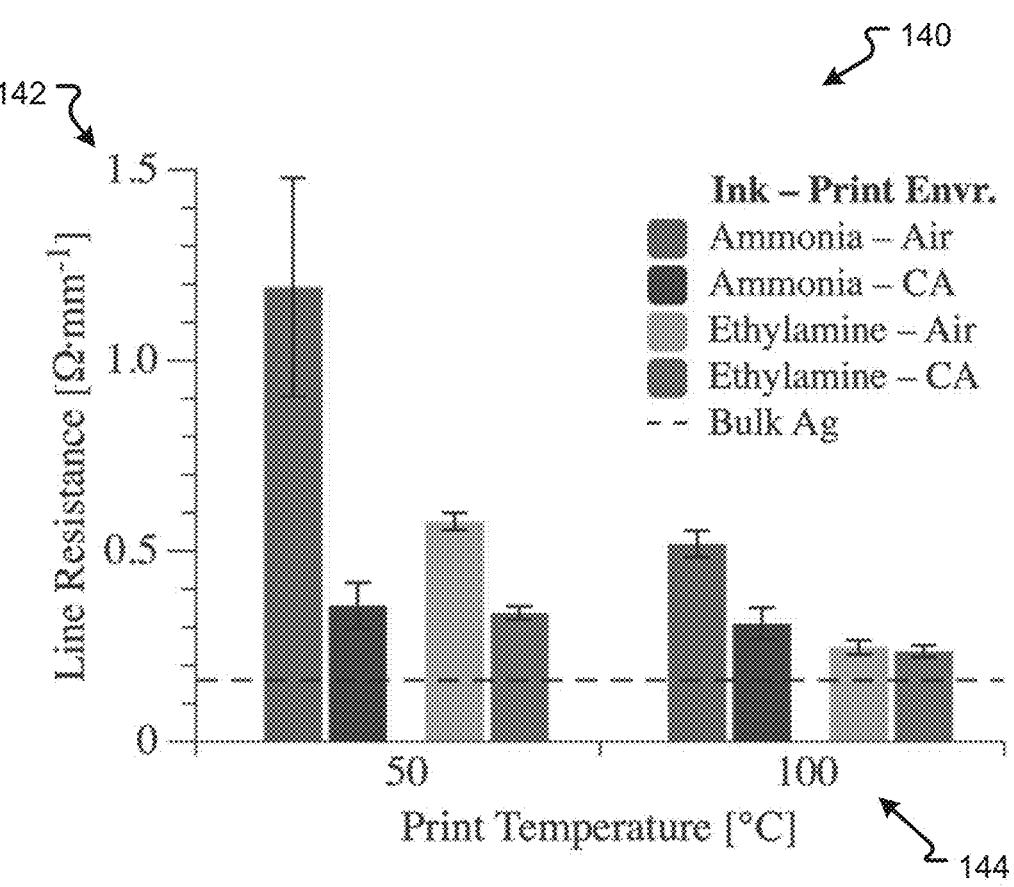
FIG. 9 illustrates a chart of the line resistance of the silver lines of FIG. 8 according to at least one embodiment of the present disclosure.

Turning to FIGS. 7A-9, a schematic drawing of a printer 128A with an enclosed printing environment 135 is generally illustrated in FIG. 7A, a schematic drawing of a printer 128B with an open printing environment 136 is shown in FIG. 7B, SEM images 138 from a cross-sectional view of lines of a target material 114 printed using reactive inks 112 printed in different printing environments are provided in FIG. 8, and a chart 140 showing line resistance 142 (on the y-axis) of lines of target material 114 produced by reactive inks at different print temperatures 144 (on the x-axis) of the reactive inks 112 printed in different printing environments is shown in FIG. 9.

As shown in FIG. 7A, according to at least one embodiment, a printer 128A may comprise a printing environment 135 that is enclosed. Said differently, the printer 128A may include an enclosure 129 that substantially surrounds a substrate 108 to be printed with a reactive ink.

The printer 128A generally comprises a print head 146, a cover or lid 148, a base 150, an ink dispenser 152 configured to deliver the reactive ink 112 onto the substrate 108 positioned within the enclosed printing environment 135, and one or more walls 156.

In some embodiments, the print head 146 is operable to move in one or more of the X-dimension, the Y-dimension, and the Z-dimension such that the ink dispenser 152 can dispense the reactive ink to predetermined portions of the substrate 108. Additionally, or alternatively, in some embodiments the base 150 may be configured to move in one or more of the X-dimension, the Y-dimension, and the Z-dimension to move the substrate 108 relative to the ink dispenser 152 such that the ink dispenser can dispense reactive ink to predetermined portions of the substrate 108.

The lid 148, the base 150, and the walls 156 define the enclosure 129 and thus the enclosed printing environment 135. In some embodiments, the enclosed printing environment 135 is substantially sealed. Optionally, the lid 148 is attached to the wall 156. Alternatively, the lid 148 may rest on (or at least contact) an upper surface of the wall 156. In some embodiments, the lid 148 may optionally move in the X-dimension and/or the Y-dimension relative to the wall 156, the base 150, and/or the substrate 108.

The lid 148 may optionally include an aperture through which a portion of the print head 146 can extend. In some embodiments, the print head 146 may move in the Z-dimension with respect to the lid 148. Optionally, the lid 148 may move in one or more of the X-dimension and the Y-dimension in response to a force received from the print head 146 as the print head (and its associated ink dispenser) moves in the X-dimension and/or the Y-dimension.

In some embodiments, a heater 154 may optionally be provided to heat the substrate 108. The heater 154 may be of any type and positioned in any suitable position. In at least one embodiment, the heater 154 may be adapted and operable to heat the substrate 108 without contacting the substrate 108. Additionally, or alternatively, in some embodiments the heater 154 is adapted and operable to heat the substrate 108 by contact with the substrate 108. For example, the heater 154 may contact one or more surfaces of the substrate 108. In at least one embodiment, the heater 154 is positioned below the substrate 108. In some embodiments, the heater 154 is positioned in contact with the base 150. For example, the heater 154 may be positioned within the base 150.

The atmosphere inside of the enclosed printing environment 135 may be saturated with a substance 159. The substance 159 may be a gas. In some embodiments, the substance 159 is in a vapor phase. Additionally, or alternatively, at least some of the substance 159 may be present in the enclosed printing environment 135 as one or more of an aerosol, a liquid, and a solid. The substance 159 is selected and operable to achieve one or more of: (1) controlling (or adjusting) the evaporation rate of complexing agents 118 and reactants used to stabilize the reactive ink 112; (2) controlling a timing or rate of reaction of the reactive ink 112; and (3) altering a pressure of the atmosphere within the enclosed printing environment 135. The substance 159 may comprise, for example, one or more of: an active ingredient, an inactive ingredient, water, a complexing agent 118 associated with the reactive ink 112 used by the printer, a catalyst, a product, and/or a reactant.

The substance 159 may be selected to trigger the reactive ink to form the target material 114. For example, some currently known reactive inks have limited stability at room temperature (20-22° C.). Accordingly, these known reactive inks may only be used within a very narrow temperature range (such as about 19-23° C.), which limits their use.

A reactive ink 112 of embodiments of the present disclosure may, by contrast, be adapted to be very stable over a wide temperature range (for example, a temperature range of about −40° C. to about 400° C.). The reactive ink 112 could be activated (or triggered) by a substance 159 comprising a reactant in the enclosed printing environment 135.

In some embodiments, the atmosphere may be saturated with the substance 159 to a predetermined humidity level (or percentage) using, for example, a reservoir 158 to store, for example, the substance 159 in the enclosed printing environment 135. Optionally, a dispenser 160 is provided at least partially within the reservoir 158 to facilitate dispersal of the substance 159. In some embodiments, the dispenser 160 may comprise a fiber. The fiber may be man-made or natural, such as a wick or a piece of cloth or fabric. In some embodiments, the dispenser 160 may be an absorbent clean room cloth. Any suitable material known to those of skill in the art operable to disperse the substance 159 within the enclosed environment 135 may be used as the dispenser 160.

It will be appreciated that in other embodiments, the substance 159 (or complexing agent, catalyst, product, reactant, etc.) can be distributed to the atmosphere within the enclosed environment 135 in any way. For example, the substance 159 may be injected into the enclosed environment 135. Optionally, the substance 159 may be added to the enclosed environment 135 as a solid, as a liquid, as an aerosol, or as a gas during operation of the printer 128A. In some embodiments, the substance 159 can be localized and delivered in an open printing environment, as will be discussed in reference to FIG. 7B.

In some embodiments, the printer 128A may optionally comprise one or more sensors 161 to measure a condition within the enclosed environment. For example, in one embodiment, the sensor 161 is operable to measure a concentration of the substance 159 within the enclosed environment 135. Optionally, the sensor 161 (or a second sensor) may be operable to measure other conditions within the enclosed environment, such as (but not necessarily limited to) temperature and/or pressure. Any suitable sensor(s) 161 known to those of skill in the art may be positioned within the enclosure 129.

Turning to FIG. 7B, a printer 128B with an open printing environment 136 according to at least one embodiment of the present disclosure is schematically illustrated. The printer 128B is similar to the printer 128A and may comprise the same or similar components and operate in the same or similar manner. However, the printer 128B does not include a wall 158, a lid 148, or an enclosure 129.

The printer 128B includes a print head 162 and an ink dispenser (or needle) 164 configured to deliver a reactive ink 112 onto a substrate 108. The print head 162 is optionally the same as or similar to the print head 146. In some embodiments, the print head 162 and its associated dispenser 164 are operable to move in one or more of the X-dimension, the Y-dimension, and the Z-dimension to distribute the reactive ink 112 to predetermined portions of the substrate 108. In other embodiments, the print head 162 is configured to be substantially stationary relative to the substrate 108, which is moved with respect to the print head 162 and its ink dispenser 164.

In some embodiments, the substrate 108 is positioned on an optional base 170. The base 170 may be the same as (or similar to) the base 150. Optionally, the base 170 is configured to move similar to the base 150. For example, in some embodiments the base 170 may move in one or more of the X-dimension, the Y-dimension, and the Z-dimension to move the substrate 108 relative to the ink dispenser 164 such that the ink dispenser 164 can dispense the reactive ink 112 to predetermined portions of the substrate 108.

In addition, the printer 128B may optionally include a heater 172 that is the same as or similar to heater 154. The heater 172 may optionally be provided to heat the substrate 108. The heater 172 may be of any suitable type and positioned in any suitable location. In at least one embodiment, the heater 172 may be adapted and operable to heat the substrate 108 without contacting the substrate 108. Additionally, or alternatively, in some embodiments the heater 172 is adapted and operable to heat the substrate 108 by contact with the substrate 108. For example, the heater 172 may contact one or more surfaces of the substrate. In at least one embodiment, the heater is positioned below the substrate 108. In some embodiments, the heater 172 is positioned in contact with the base 170. For example, the heater 172 may be positioned within the base 170.

The printer 128B also includes an injector 166 configured to deliver a localized volume of the substance 159 proximate to the substrate 108. Optionally, the injector 166 may be operable to deliver the substance 159 as a vapor. The injector 166 may deliver, for example, a substance 159 (such as one or more of a saturating complexing agent 118, water, the catalyst, the product, or the reactant) to the localized volume to form a saturated volume 168. It will be appreciated that in some embodiments, the injector 166 can be selectively turned on and off to create saturated volume(s) 168 in desired locations. In other words, the reactive ink 112 may be printed without (or outside of) the saturated volume 168 in some locations and may be printed with the saturated volume 168 in other locations.

The saturated volume 168 (whether in the enclosed printing environment 135 or the open printing environment 136) may enable a control over the morphology and properties of the printed ink by controlling a loss of the complexing agent 118 or catalyst from the reactive ink 112. More specifically, by controlling the loss of the complexing agent 118 or catalyst from the reactive ink 112, the reaction to form the target material 114 as a film occurs closer to the substrate 108, thus resulting in a denser film of the target material 114. For example, in embodiments where the reactive ink 112 is SiO$_2$ printed with tetraethyl orthosilicate (TEOS), controlling an evaporation of ethanol (a product of TEOS hydrolysis/condensation) can accelerate or decelerate SiO$_2$ nucleation, growth, and film quality.

It will be appreciated that a localized printing environment can be formed using any component to control a contact angle of the reactive ink 112 on the substrate 108, a substrate temperature, an atmosphere temperature, an atmosphere pressure, an atmosphere humidity or saturation, etc. For example, the injector 166 of printer 128B can be used to form a localized saturated volume 168 and the heater 154, 172 may be used to heat the substrate 108. In another example, the enclosed printing environment 135 may be used to control a temperature and/or pressure of the atmosphere within the enclosure 129.

Turning to FIG. 8, cross-sectional SEM images 138A, 138B, 138C, 138D, 138E, 138F, 138G and 138H of lines of a target material 114 printed using reactive inks 112A and 112B are provided. The target material 114 is silver. The reactive inks 112 were printed in both an unsaturated environment (such as ambient conditions, or "air") to form the lines of the target material 114 in images 138A, 138B, 138C and 138D. In contrast, the lines shown in images 138E, 138F, 138G and 138H were formed from the reactive inks 112 printed in an environment saturated with a substance 159. In this example, the substance 159 was a high vapor pressure complexing agent 118 (ammonia) (for images 138E and 138G) and a low vapor pressure complexing agent 118 (ethylamine) (for images 138F and 138H). The printing temperature was 50° C. for the four images to the left and 100° C. for the other four images to the right of FIG. 8.

Printing the reactive inks 112 in a printing environment saturated with the saturating complexing agent 118 (e.g., images 138E, 138F, 138G and 138H) beneficially resulted in slower evaporation rates of the complexing agent 118 of the reactive inks 112, thus resulting in a higher density of the lines 117 of the target material 114. In contrast, the reactive inks 112 printed in a printing environment in which the atmosphere is not saturated (e.g., images 138A, 138B, 138C and 138D) resulted in lines 117 of the target materials 114 which were less dense. Notably, images 138A, 138B and 138C show lines 117 of silver which have large voids and inconsistencies.

Similarly, as shown in FIG. 9, a chart 140 showing the line resistance of the lines 117 of the target material 114 shown in FIG. 8 illustrates that printing the reactive inks 112 in the printing environment saturated with the saturating complexing agent 118 (in these examples, either ammonia or ethylamine) results in lines of the target material 114 with lower line resistances. More specifically, the average line resistance of the target material 114 is about 1.2 Ω/mm or less.

Turning to FIG. 10, a method 1000 for controlling a morphology of a printed reactive ink is provided. The method 1000 may use any of the methodologies and any devices described herein to control a printing environment of a reactive ink.

The method 1000 may include providing a reactive ink and a substrate (step 1004). The reactive ink may be the same as or similar to the reactive inks 112 described herein. The reactive ink 112 may be, for example, silver ink, platinum ink, gold ink, nickel ink, glass ink, or copper ink. It will be appreciated that the reactive ink 112 may comprise any metals and metal alloys (e.g., alloys of any two or more of Ag, Fe, Ni, Co, W, etc.), oxides (e.g., SiO$_2$, TiO$_2$, etc.), polymers (e.g., silicone, epoxies, etc.), and/or semiconductor materials (perovskites, etc.). The substrate may be a substrate 108 as disclosed herein and may include, for example, glass, fiberglass, plastic, fiberglass-reinforced epoxy resin, polyimide, polymer-ceramic composites, metal (e.g., aluminum, copper, etc.), polyethylene terephthalate (PET), etc.

The method 1000 may also include saturating a volume with a predetermined substance 159, such as an active ingredient and/or an inactive ingredient to a humidity level (step 1008). The volume may be saturated with an active ingredient and/or an inactive ingredient. The active ingredient and/or inactive ingredient may be, for example, water vapor, a saturating complexing agent, a catalyst, a product, and/or a reactant. In some embodiments, the reactive ink 112 includes a complexing agent 118 that is the same as the saturating complexing agent. In other embodiments, the reactive ink 112 includes a complexing agent 118 that is different from the saturating agent. In some embodiments, the complexing agent 118 of the reactive ink 112 and/or the saturating complexing agent with which the volume is saturated in step 1008 may be, for example, selected from the group consisting of ammonia, amines having 1-15 carbon atoms, strong or weak acids (including, e.g., hydrochloric acid, nitric acid, formic acid, and acetic acid), and combinations thereof.

In embodiments where the volume is saturated with a catalyst, the reactants in the reactive ink 112 may be separated and mixed during printing of the reactive ink 112. The reactive ink 112 can then be printed in the volume saturated with the catalyst, which may result in an increase in the acceptable temperature variation (e.g., +/−5° C. or +/−10° C.) for printing the reactive ink 112.

As previously described, by saturating the volume or atmosphere within which the reactive ink 112 will be printed, a rate and/or extent of loss of the active ingredient and/or inactive ingredient (whether a complexing agent 118, a catalyst, a product, or a reactant) from the reactive ink 112 can be controlled to result in a desired morphology and properties of the resultant target material 114. For example, the porosity, density, and/or electrical resistance of the target material 114 may be adjusted or controlled over a period of time by controlling the printing environment.

The volume may be saturated with the active ingredient and/or inactive ingredient using, for example, an enclosed printing environment such as the enclosed printing environment 135 described in FIG. 7A or an open printing environment such as the open printing environment 136 described in FIG. 7B. It will be appreciated that components from FIGS. 7A and 7B (or any other component not described herein) may be combined to control the printing environment.

It will be appreciated that the volume that is saturated includes at least a portion of the substrate. In some embodiments, the volume includes the entire substrate such as, for example, when the substrate is fully enclosed in the enclosed printing environment 135. In other embodiments, the volume includes the portion of the substrate such as, for example, when a localized printing environment is formed on the substrate in the open printing environment 136.

The method 1000 may also include heating at least a portion of the substrate (step 1012). The substrate may be heated by a heater such as the heater 154 and/or heater 172. Similarly to the step 1008, the portion of the substrate may include the whole substrate. In other words, the entire substrate may be heated. In other embodiments, the portion of the substrate may be heated to form a localized heated portion of the substrate.

It will be appreciated that the steps 1008 and step 1012 may occur simultaneously or in sequence. For example, the substrate may be heated and saturated with the active ingredient and/or the inactive ingredient at the same time. In other embodiments, the substrate may be heated, then saturated with the active ingredient and/or the inactive ingredient.

The method 1000 may also include printing the reactive ink 112 onto the portion of the substrate (step 1016). The reactive ink 112 is printed onto the portion of the substrate using, for example, a print head such as the print head 146, 162. The reactive ink 112 may be printed onto the substrate while the substrate is heated and is within the saturated volume (whether within an open or enclosed printing environment). The reactive ink 112 may be printed in at least one layer. In some embodiments, the reactive ink 112 may be printed in two layers or more than two layers.

The method 1000 may also include adjusting at least one of a humidity level of the saturated volume, a temperature of the heated substrate, a temperature of an atmosphere of the volume, and a pressure of the atmosphere of the volume (step 1020). By adjusting one or more of the humidity levels of the saturated volume, the temperature of the heated substrate, the temperature of the atmosphere of the volume, and the pressure of the atmosphere of the volume, the morphology and properties of the resultant target material 114 may be adjusted. For example, adjusting the temperature of the heated substrate may result in a change in the density or porosity of the resultant target material 114.

Additionally, the reactive ink 112 may be adjusted to include a different complexing agent 118 or catalyst. For example, a reactive ink 112 with a lower vapor pressure may be selected to form a target material 114 with fewer pores. In another example, a reactive ink 112 with a higher vapor pressure may be selected to form a target material 114 with larger pores. Similarly, the substrate may be changed or adjusted. Further, the active ingredient and/or the inactive ingredient may be adjusted or changed.

By controlling the printing environment of the reactive ink 112, improvement of the performance of the resultant target material 114 is increased while decreasing the number of layers needed to be printed. For example, denser films can be printed while printing fewer layers. More specifically, reactive inks 112 can be used to reduce silver consumption in a photovoltaic cell by 90% while improving cell performance by 10% to 20%. Further, the systems and methods of the present disclosure permit printing reactive inks 112 over a wider temperature range than prior art systems and methods. For example, conventional methods of printing reactive inks 112 have a processing temperature window of +/−1° C. that typically requires about 50 layers to fully metallize the photovoltaic cell. By controlling the printing environment as described herein, the processing temperature window can be increased to +/−10° C. while increasing loading of the target material 114 by a factor of about five or more, thus reducing the number of layers that must be printed from about 50 to about 10 or fewer.

Additionally, the electrical resistance of the printed target material 114 may be decreased by controlling the printing environment, which may improve, for example, the performance of batteries and/or photovoltaic cells. An additional benefit of controlling the printing environment of a reactive ink 112 includes enabling the printing of oxides such as, for example, silver oxide, lithium oxide, nickel oxide, etc. Such oxides can be used to form, for example, car batteries. Thus, a morphology and properties of a target material 114 such as, for example, a porosity, density, and electrical resistance may be adjusted by controlling the printing environment.

The exemplary systems and methods of this disclosure have been described in relation to controlling a morphology of a printed reactive ink 112 using enclosed or open printing environments. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A method of controlling a morphology of a target material formed by printing a reactive ink, comprising:
   providing the reactive ink and a substrate;
   prior to printing the reactive ink, saturating an atmosphere proximate to a portion of a surface of the substrate with a predetermined substance,
   wherein the predetermined substance includes a saturating complexing agent or a catalyst; and
   printing the reactive ink onto the portion of the surface of the substrate,
   wherein the morphology of the printed reactive ink is controlled based on a concentration of the predetermined substance in the atmosphere.

2. The method of claim 1, wherein the atmosphere is enclosed in an enclosure to form an enclosed printing environment.

3. The method of claim 1, wherein the predetermined substance is provided in the atmosphere in a vaporized form.

4. The method of claim 1, wherein the predetermined substance comprises the saturating complexing agent and wherein the reactive ink includes a complexing agent different than the saturating complexing agent of the predetermined substance used to saturate the atmosphere.

5. The method of claim 1, wherein the predetermined substance comprises the saturating complexing agent and wherein the reactive ink includes a complexing agent that is the same as the saturating complexing agent of the predetermined substance used to saturate the atmosphere.

6. The method of claim 1, wherein the predetermined substance comprises the saturating complexing agent and wherein the saturating complexing agent comprises at least one of ammonia, one or more amines having 1-15 carbon atoms, hydrochloric acid, nitric acid, formic acid, and acetic acid.

7. The method of claim 1, wherein the predetermined substance comprises the catalyst.

8. The method of claim 1, wherein the reactive ink further comprises chemical precursors to produce a layer of a target material on the substrate, the target material comprising at least one of silver, platinum, gold, nickel, glass, and copper.

9. The method of claim 1, wherein a temperature of the atmosphere is an ambient temperature.

10. The method of claim 1, further comprising:
    adjusting at least one of the concentration of the predetermined substance in the atmosphere, a temperature of the portion of the substrate, a temperature of the atmosphere, and a pressure of the atmosphere to control the morphology of the printed reactive ink.

11. The method of claim 1, wherein the atmosphere includes an entire surface of the substrate.

12. The method of claim 1, wherein the atmosphere is saturated locally by an injector configured to deliver the predetermined substance to the atmosphere.

13. The method of claim 12, wherein the reactive ink is printed in an open printing environment.

\* \* \* \* \*